(12) United States Patent
Hamilton

(10) Patent No.: US 10,451,888 B2
(45) Date of Patent: Oct. 22, 2019

(54) RETICLE FOR OPTICAL SIGHTING DEVICES

(71) Applicant: Sheltered Wings, Inc., Middleton, WI (US)

(72) Inventor: David M. Hamilton, Mt. Horeb, WI (US)

(73) Assignee: SHELTERED WINGS, INC., Middleton, WI (US)

( * ) Notice: Subject to any disclaimer, the term of this patent is extended or adjusted under 35 U.S.C. 154(b) by 256 days.

(21) Appl. No.: 14/928,832

(22) Filed: Oct. 30, 2015

(65) Prior Publication Data

US 2017/0123224 A1    May 4, 2017

(51) Int. Cl.
*G02B 23/00* (2006.01)
*G02B 27/32* (2006.01)
*F41G 1/38* (2006.01)
*G02B 23/14* (2006.01)

(52) U.S. Cl.
CPC ............. *G02B 27/32* (2013.01); *F41G 1/38* (2013.01); *G02B 23/14* (2013.01)

(58) Field of Classification Search
CPC ..... F41G 1/38; F41G 3/08; F41G 1/12; F41G 1/473; F41G 3/00; F41G 3/06; F41G 3/12; G02B 23/14; G02B 27/32; G02B 23/00
See application file for complete search history.

(56) References Cited

U.S. PATENT DOCUMENTS

| | | |
|---|---|---|
| 5,920,995 A | 7/1999 | Sammut |
| 6,032,374 A | 3/2000 | Sammut |
| D456,057 S | 4/2002 | Smith, III |
| 6,453,595 B1 | 9/2002 | Sammut |
| 6,516,699 B2 | 2/2003 | Sammut et al. |
| 6,614,975 B2 | 9/2003 | Richardson et al. |
| 6,681,512 B2 | 1/2004 | Sammut |
| D567,324 S | 4/2008 | Pride et al. |
| D567,325 S | 4/2008 | Pride et al. |
| D567,326 S | 4/2008 | Pride et al. |
| 7,712,225 B2 | 5/2010 | Sammut |
| 7,832,137 B2 | 11/2010 | Sammut et al. |
| 7,856,750 B2 | 12/2010 | Sammut et al. |
| D631,125 S | 1/2011 | Huber |
| 7,877,886 B1 * | 2/2011 | Hamilton ................. F41G 1/12 33/297 |
| 7,937,878 B2 | 5/2011 | Sammut et al. |
| 7,946,048 B1 | 5/2011 | Sammut |

(Continued)

OTHER PUBLICATIONS

International Search Report and Written Opinion of International Appln No. PCT/US16/59021 dated Jan. 5, 2017, 7 pages.

(Continued)

*Primary Examiner* — William R Alexander
*Assistant Examiner* — Balram T Parbadia
(74) *Attorney, Agent, or Firm* — Husch Blackwell LLP

(57) ABSTRACT

A reticle for an optical sighting device, such as a riflescope, that has subtension markings of varying thicknesses and scales to accommodate both stationary and moving targeting. In certain embodiments, the reticle has a plurality of fine subtension markings and coarse subtension markings positioned along the horizontal stadia line, with the coarse subtension markings having a thickness greater than the thickness of the fine subtension markings.

20 Claims, 17 Drawing Sheets

(56) References Cited

U.S. PATENT DOCUMENTS

| | | | | |
|---|---|---|---|---|
| 7,958,643 B1 * | | 6/2011 | Wu | G02B 23/14 33/297 |
| D654,136 S | | 2/2012 | Huber | |
| 8,109,029 B1 | | 2/2012 | Sammut et al. | |
| 8,230,635 B2 * | | 7/2012 | Sammut | F41G 1/38 42/122 |
| 8,353,454 B2 | | 1/2013 | Sammut et al. | |
| 8,656,630 B2 | | 2/2014 | Sammut | |
| D700,944 S | | 3/2014 | Mikroulis | |
| D700,945 S | | 3/2014 | Mikroulis | |
| 8,707,608 B2 * | | 4/2014 | Sammut | F41G 1/38 42/122 |
| D715,394 S | | 10/2014 | Young | |
| D715,395 S | | 10/2014 | Young et al. | |
| 8,893,971 B1 | | 11/2014 | Sammut et al. | |
| 8,905,307 B2 | | 12/2014 | Sammut et al. | |
| D722,360 S | | 2/2015 | Pride | |
| 8,959,824 B2 | | 2/2015 | Sammut et al. | |
| 8,966,806 B2 * | | 3/2015 | Sammut | F41G 1/38 42/122 |
| 8,991,702 B1 | | 3/2015 | Sammut | |
| D726,280 S | | 4/2015 | Mikroulis | |
| 9,068,794 B1 * | | 6/2015 | Sammut | F41G 1/38 |
| D741,445 S | | 10/2015 | Pride | |
| D745,105 S | | 12/2015 | Mikroulis | |
| D745,168 S | | 12/2015 | White et al. | |
| D749,688 S | | 2/2016 | Harris | |
| 9,250,038 B2 | | 2/2016 | Sammut et al. | |
| 9,255,771 B2 | | 2/2016 | Sammut et al. | |
| 9,335,123 B2 * | | 5/2016 | Sammut | F41G 1/38 |
| D758,523 S | | 6/2016 | Mikroulis | |
| D767,077 S | | 9/2016 | Mikroulis | |
| D767,659 S | | 9/2016 | Mikroulis | |
| D767,660 S | | 9/2016 | Mikroulis | |
| D767,661 S | | 9/2016 | Mikroulis | |
| 9,459,077 B2 * | | 10/2016 | Sammut | F41G 1/38 |
| 9,500,444 B2 | | 11/2016 | Sammut et al. | |
| 9,574,850 B2 | | 2/2017 | Sammut et al. | |
| D781,989 S | | 3/2017 | Pride | |
| D783,113 S | | 4/2017 | Noller et al. | |
| D783,115 S | | 4/2017 | Noller et al. | |
| D783,763 S | | 4/2017 | Pride | |
| 9,612,086 B2 | | 4/2017 | Sammut et al. | |
| D802,702 S | | 11/2017 | Zhang | |
| D803,973 S | | 11/2017 | Kedairy | |
| D805,156 S | | 12/2017 | Noller et al. | |
| 9,869,530 B2 * | | 1/2018 | Sammut | F41G 1/38 |
| 2011/0107649 A1 * | | 5/2011 | Buck | F41G 1/473 42/130 |
| 2014/0166751 A1 * | | 6/2014 | Sammut | F41G 1/38 235/404 |
| 2015/0276346 A1 * | | 10/2015 | Hamilton | F41G 1/473 42/123 |

OTHER PUBLICATIONS

Interntaional Preliminary Report on Patentability of International Appln. No. PCT/US16/59021 dated May 1, 2018, 5 pages.

* cited by examiner

RETICLE FOR OPTICAL SIGHTING DEVICES

FIELD OF THE INVENTION

The present invention relates generally to optical sighting devices for use with firearms. More particularly, the present invention relates to a reticle for use in an optical sighting device.

BACKGROUND

Riflescopes and reticles are changing continuously as shooting changes and technology develops. There have been a number of recent advances in reticle design, but none have fully resolved all of the problems or limitations in certain types of shooting.

Typical riflescopes have two focal planes, one in front of the zoom magnification system (that is, the erector system), and the other behind the zoom magnification system. A reticle may be placed at either of the focal planes, and there are advantages and disadvantages related to each. Reticles placed in front of the zoom magnification system are typically called "first focal plane" reticles and those placed behind the zoom magnification system are typically called "second focal plane" reticles.

The majority of shooters prefer first focal plane reticles. Such reticles and the image viewed through the riflescope will change in size in proportion to one another: as the image gets bigger, the information on the reticle gets bigger at the same rate. One advantage to a first focal plane reticle is that any measurement marks on the reticle will be accurate at any magnification setting the user chooses. As the image is magnified, the information on the reticle appears to get larger along with the image at the same rate, so all reticle markings will be accurate to its designed scale of measurement. Further, the lines which make-up the reticle will get thicker to the user's eye at higher magnifications, and thinner at lower magnifications.

In addition, shooters commonly encounter targets that may be either stationary or moving. For moving targets, it is often advantageous to use a lower magnification setting in order to maximize the field of view through the riflescope. For stationary targets, however, large field of view is not nearly as important, so the shooter can take advantage of a higher magnification setting. As a result, a shooter who encounters both types of targets would benefit from having a reticle that provides features that cater to each.

Many shooters would like to dial their turret for elevation but hold their reticle for windage or for moving targets, rather than dialing for their elevation and windage, which they may do when targeting stationary targets. It is typically easier and faster to dial for elevation than for windage, and many shooters find dialing windage adjustments inefficient when encountering a moving target.

When shooting at stationary targets, many shooters like having a fine cross for aiming. However, some shooters prefer an "open center" for the main crosshair area of the reticle such as the Vortex EBR-2C reticle. Using connected fine subtension markings and a horizontal stadia line provide multiple fine aiming points along the horizontal axis for a shooter who dials for elevation but holds for windage on a stationary target.

It is difficult, however, to produce a reticle that works well for both stationary and moving targets where the shooter does not want to dial for windage when tracking a moving target. For example, shooters who want to dial for elevation but hold for windage lose the benefit of having a fine aiming point when not aiming at the exact center crosshair of the reticle. In addition, aiming at moving targets require less fine (coarse) subtension markings, whereas stationary targets need finer subtension marks.

Another problem with many existing reticles are that the information displayed may be confusing and/or cluttered. For example, some reticles include subtension markings of varying lengths and/or relating to angular measurements in both Milliradians (MRADs) and Minutes of Angle (MOA), making the shooter have to memorize to which graduation the subtension markings relate.

There is also a trend in sighting devices to have an increased magnification range. It is not uncommon for scopes to have 6× magnification ranges and some scopes even have magnification ranges in the 10× or more range. As magnification ranges increase, it becomes more difficult to optimize the line thickness of reticles used in the first focal plane because there is a much larger change in reticle line size over the magnification range.

As such, there is a need for a reticle for shooters that prefer to dial for elevation and hold for windage that utilizes both coarse and fine aiming points at the center crosshair as well as along the main horizontal stadia line.

SUMMARY

An optical sighting device includes an objective lens system having a center axis, an eyepiece lens, and an erector lens system forming an optical system having a first focal plane and a second focal plane, the first focal plane proximate the objective lens system, and the second focal plane proximate the eyepiece lens. The optical system has a reticle at the first focal plane. The reticle includes a horizontal stadia line and a vertical stadia line. The reticle also includes a plurality of elevation subtension markings having a thickness and are connected to the vertical stadia line. The reticle also includes a plurality of fine subtension markings having a thickness and are connected to the horizontal stadia line. Finally, the first reticle also has a plurality of coarse subtension markings having a thickness greater than the thickness of the fine subtension markings, and the coarse subtension markings are disconnected from the horizontal stadia line.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

Figure 1:
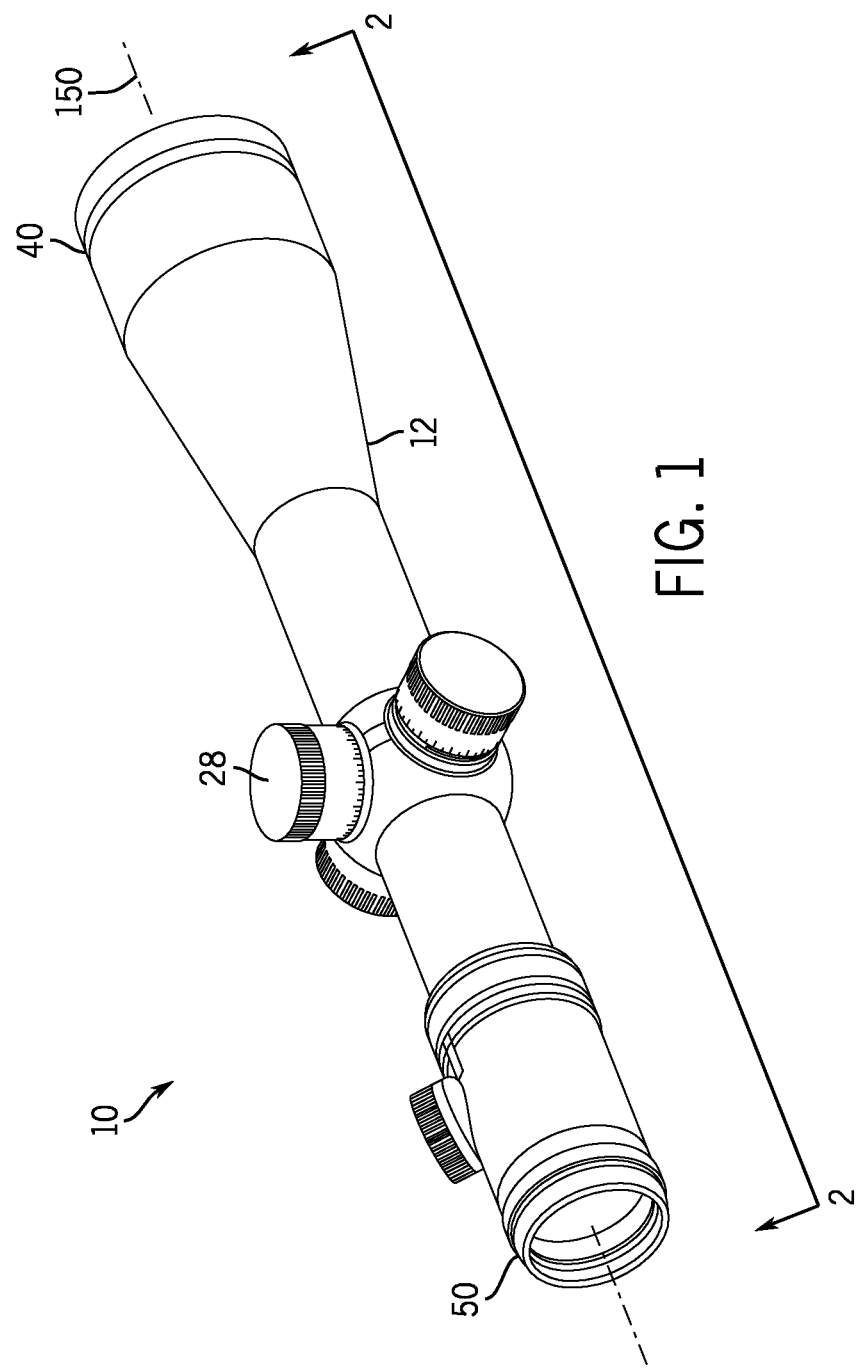
FIG. 1 is a perspective view of a riflescope optical sighting device in accordance with the present invention.
Figure 2:
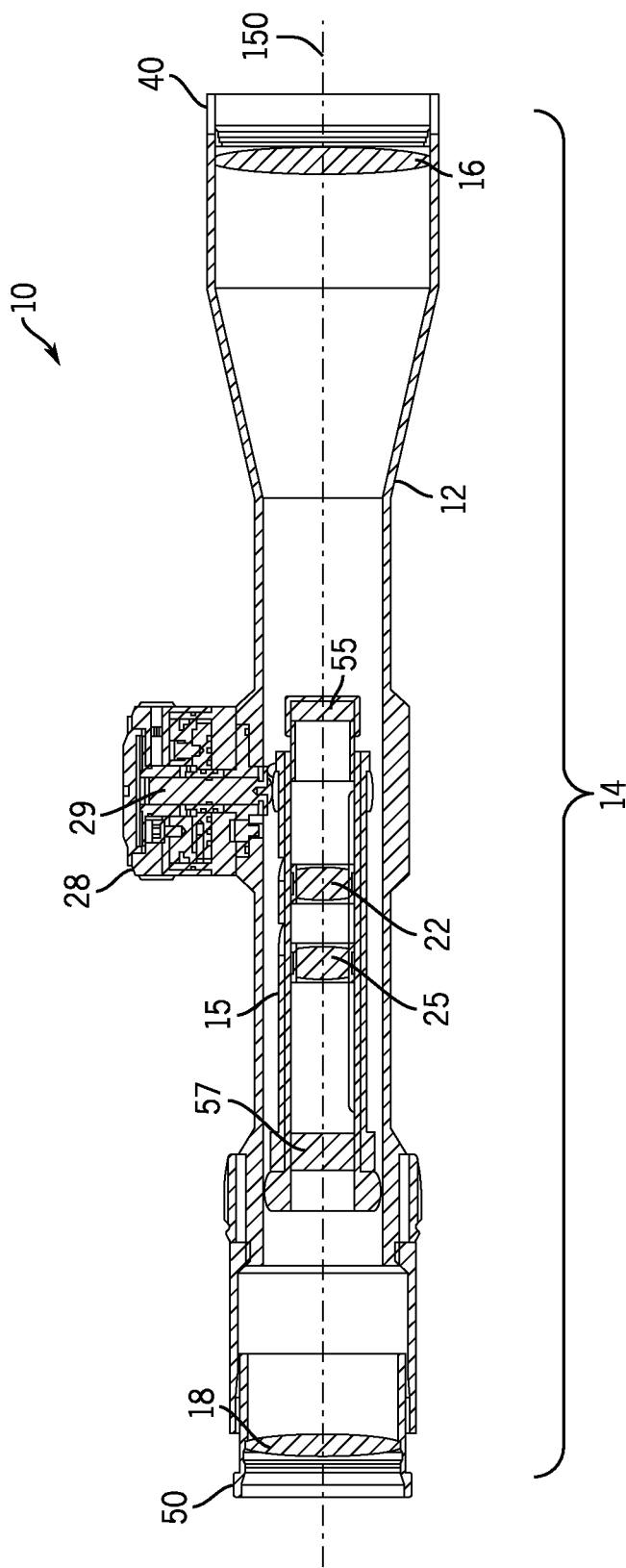
FIG. 2 is a cross-section view of the riflescope of FIG. 1 along line 2-2, showing a moveable optical element inside the scope body.

FIG. 1 shows an exemplary dual focal plane optical sighting device 10, having a scope body 12, objective lens end 40, and eyepiece end 50, and a center axis 150. FIG. 2 shows a cross-section of the sighting device from FIG. 1 showing the basic components of optical system 14 and moveable optical element 15. As shown in FIG. 2, optical system 14 includes an objective lens system 16, erector system 25, and eyepiece 18. FIG. 2 shows a riflescope embodiment of the invention having a body 12, but optical system 14 could be used in other types of sighting devices as well. Erector system 25 may be included within a moveable optic element 15. In FIG. 2, moveable optic element 15 also includes a collector 22, as well as first focal plane reticle 55 and second focal plane reticle 57. When in use, adjustment of turret assembly 28 and turret screw 29 causes adjustment of moveable optic element 15.

Figure 3:
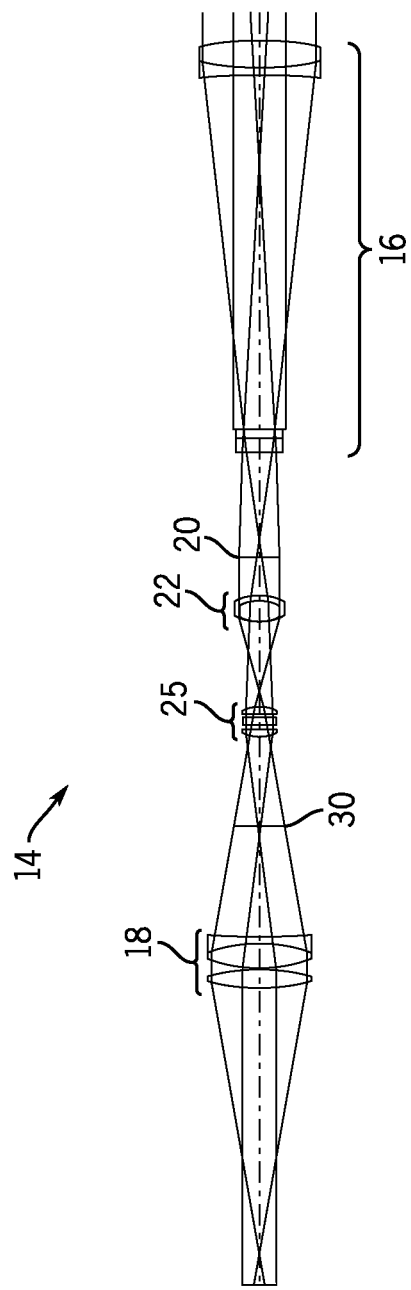
FIG. 3 is a schematic view of the erector system in the optical element of an optical sighting device in accordance with the present invention.

FIG. 3 shows a close-up view of an optical system 14 in cross-section, illustrating how light rays travel through the optical system 14. Optical system 14 may have additional optical components such as collector 22, and it is well known within the art that certain components, such as objective lens system 16, a first focal plane 20, erector system 25, a second focal plane 30, and eyepiece 18 may themselves have multiple components or lenses. Optical system 14 shown here is drawn as a basic system for illustration of one embodiment of the invention but it should be understood that variations of other optical systems with more or less structural components would be within the scope of the disclosure as well.

Figure 4A:
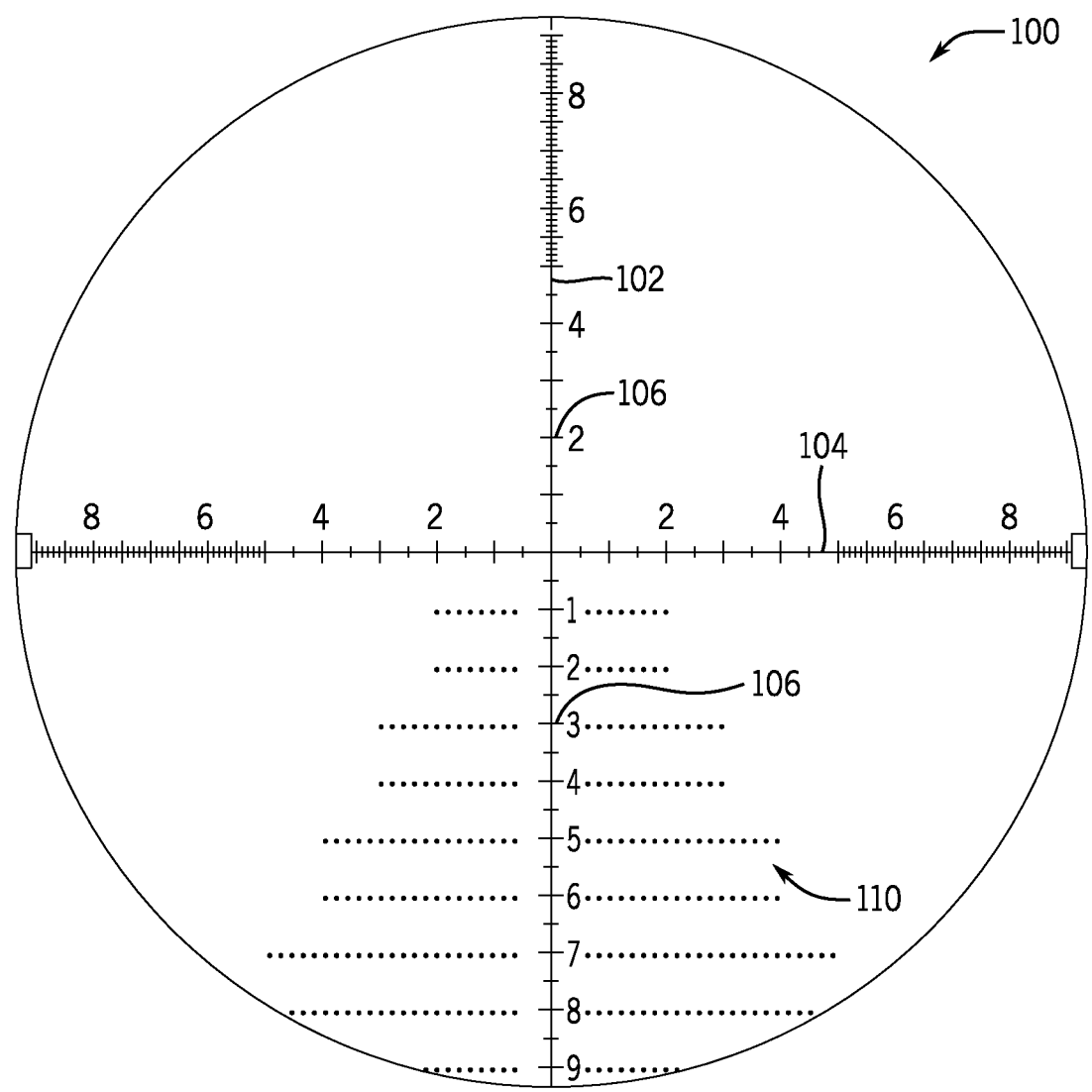
FIG. 4A is a view through one embodiment of a prior art first focal plane reticle as viewed at a lower magnification setting.
Figure 4B:
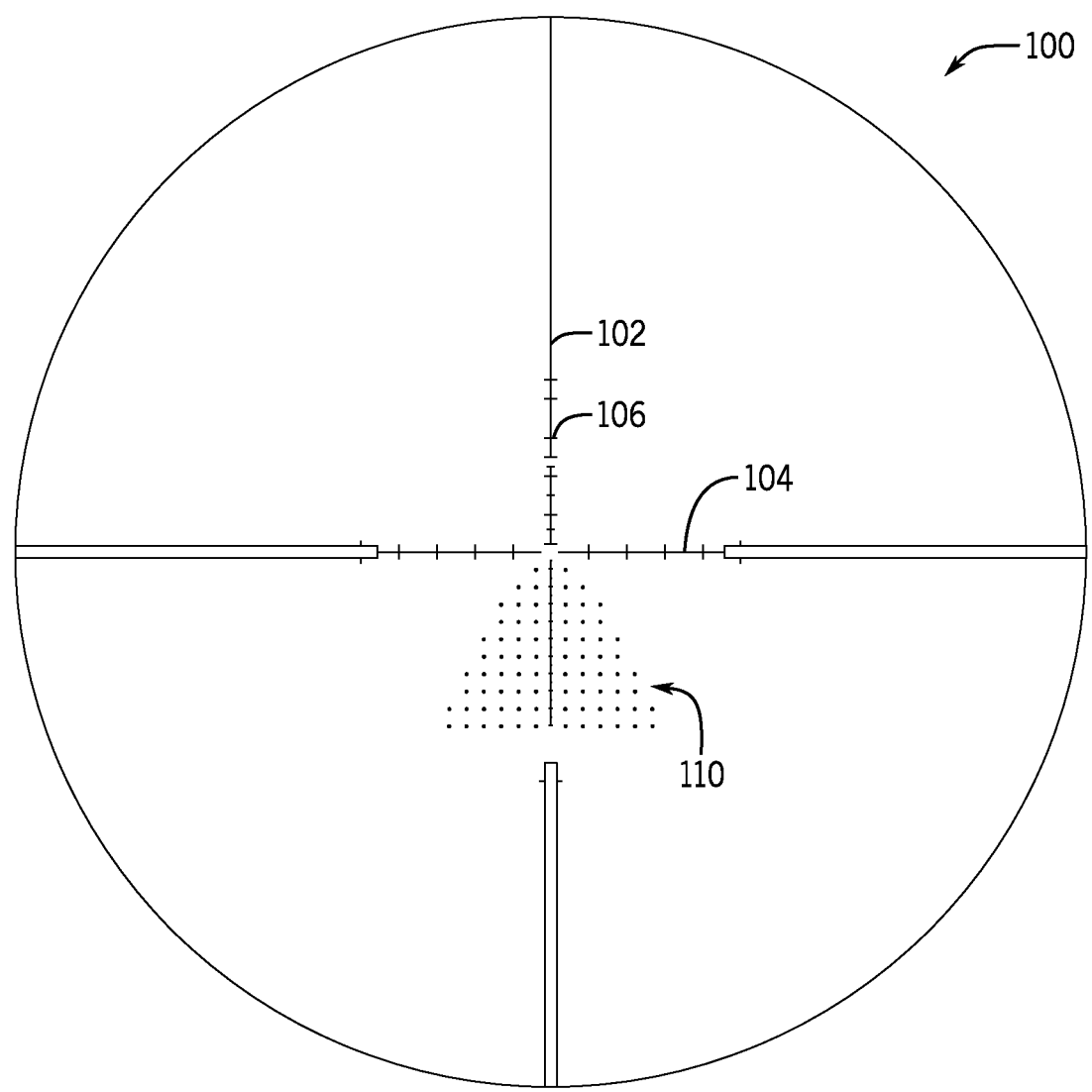
FIG. 4B is a view through the first focal plane reticle of FIG. 4A as viewed at a higher magnification setting.
Figure 5A:
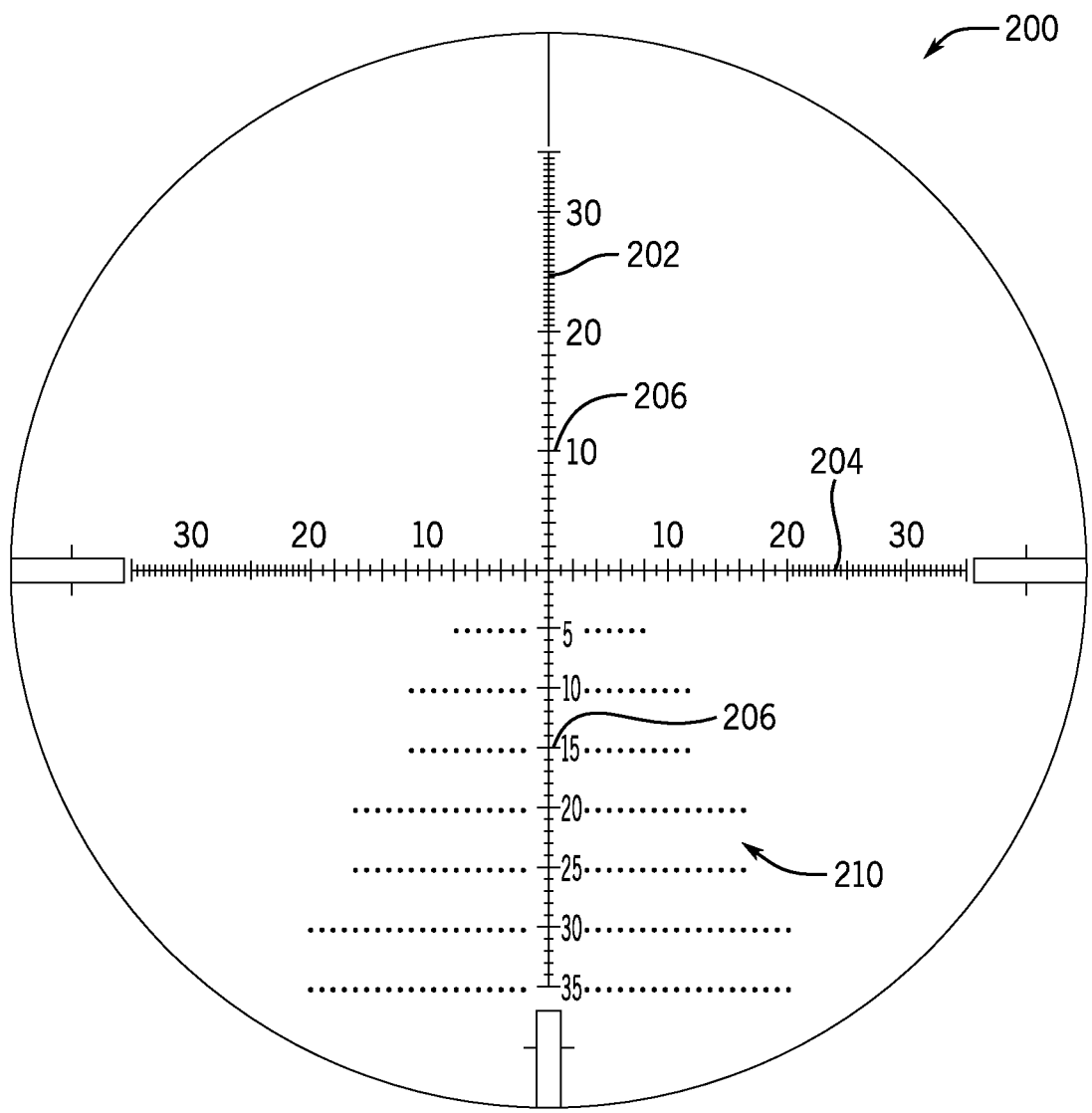
FIG. 5A is a view through one embodiment of a prior art first focal plane reticle as viewed at a lower magnification setting.
Figure 5B:
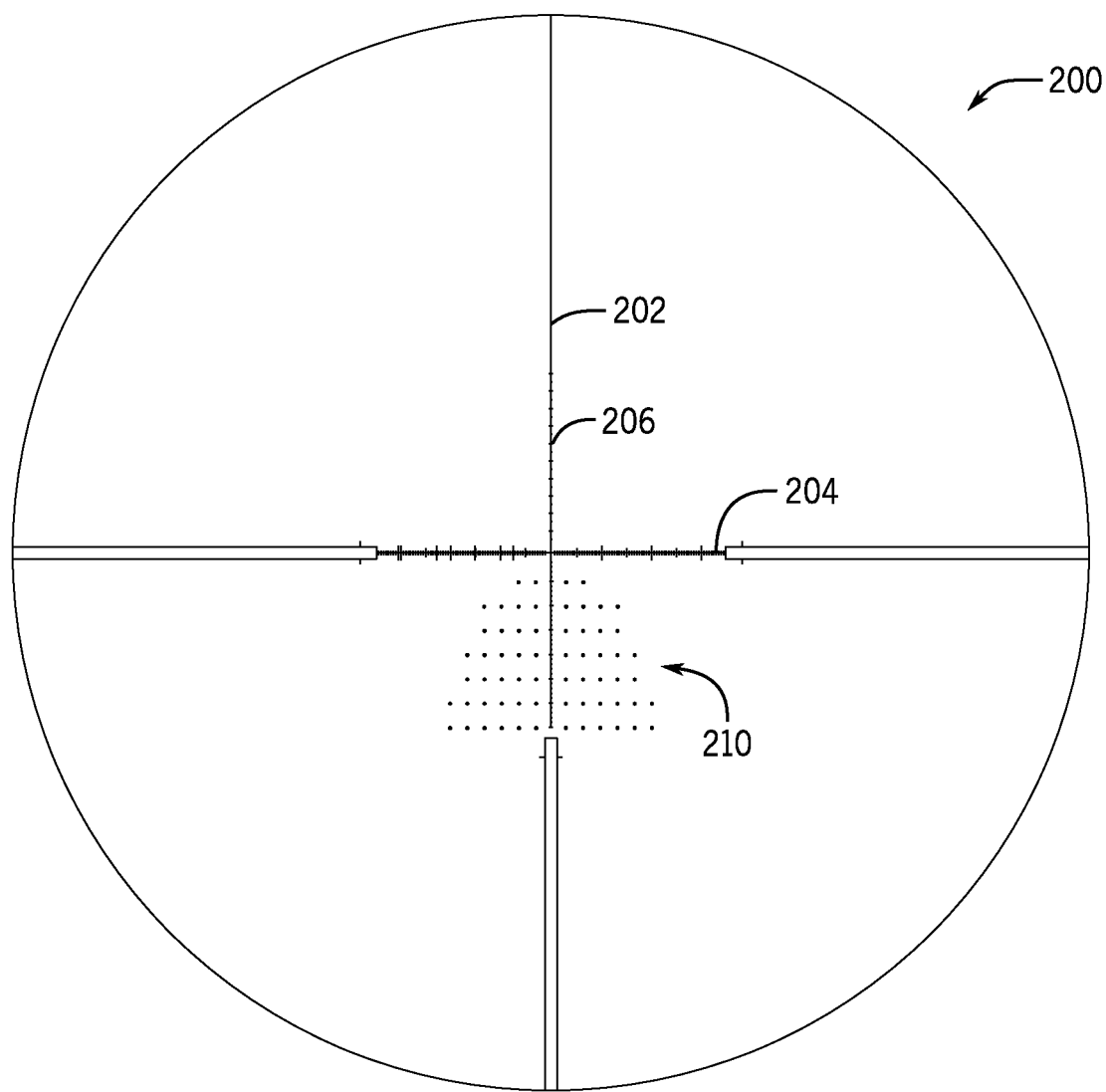
FIG. 5B is a view through the first focal plane reticle of FIG. 5A as viewed at a higher magnification setting.

FIGS. 4A-5B are views through two very similar embodiments of prior art reticles. In particular, the reticle shown in FIGS. 4A and 4B show reticle similar to a Vortex Optics EBR-2C MRAD reticle 100, and FIGS. 5A and 5B show a reticle similar to a Vortex Optics EBR-2C MOA reticle 200 (collectively, the "EBR-2C Family"). The primary difference between the reticle 100 and reticle 200 is the unit of measure used for the subtension markings, which is selected per the shooter's preference. Although the embodiments shown use MRAD and/or MOA scales, any other suitable scale may be used without departing from the invention. The EBR-2C Family includes a vertical stadia line 102, 202 and a horizontal stadia line 104, 204. Elevation subtension markings 106, 206 are provided along the vertical stadia line 102, 202. Similarly, windage subtension markings 108, 208 are provided along the horizontal stadia line 104, 204. The subtension markings 106, 206, 108, 208 provided in the EBR-2C Family are all of the same fine thickness, and all intersect either the vertical stadia line 102, 202 or the horizontal stadia line 104, 204. In addition, the lower half of each EBR-2C Family reticle includes a "Christmas tree" dot pattern 110, 210 which provides easy reference points away from the stadia lines 102, 202, 104, 204. Because each of the subtension markings 106, 206, 108, 208 intersects one of the stadia lines 102, 202, 104, 204, the EBR-2C Family of reticles is well suited for shooting at stationary targets, but lacks a more coarse set of subtension markings that would be ideal for moving targets.

Figure 6:
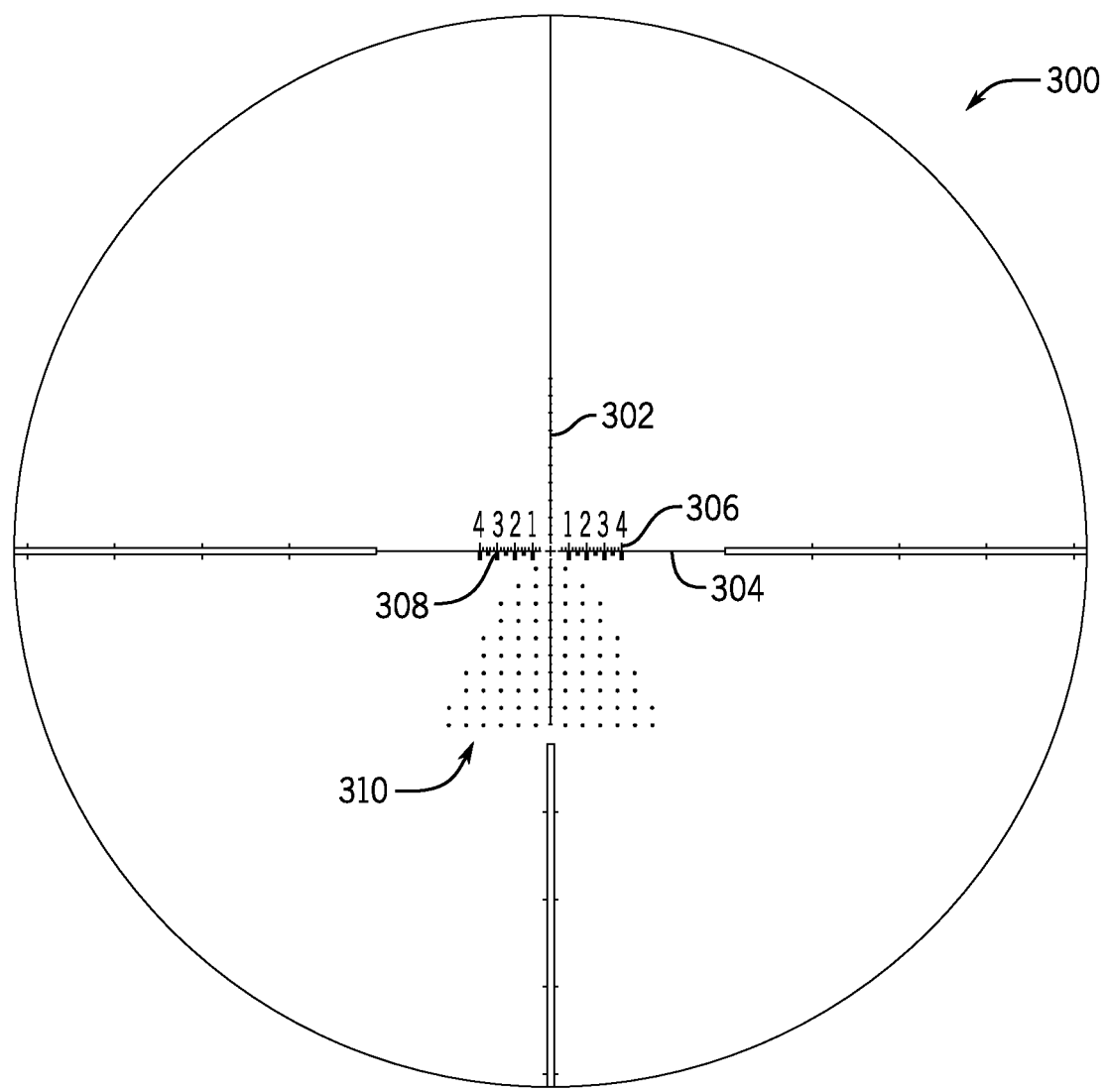
FIG. 6 is a view through one embodiment of a first focal plane reticle in accordance with the present invention as viewed at a higher magnification setting.
Figure 7:
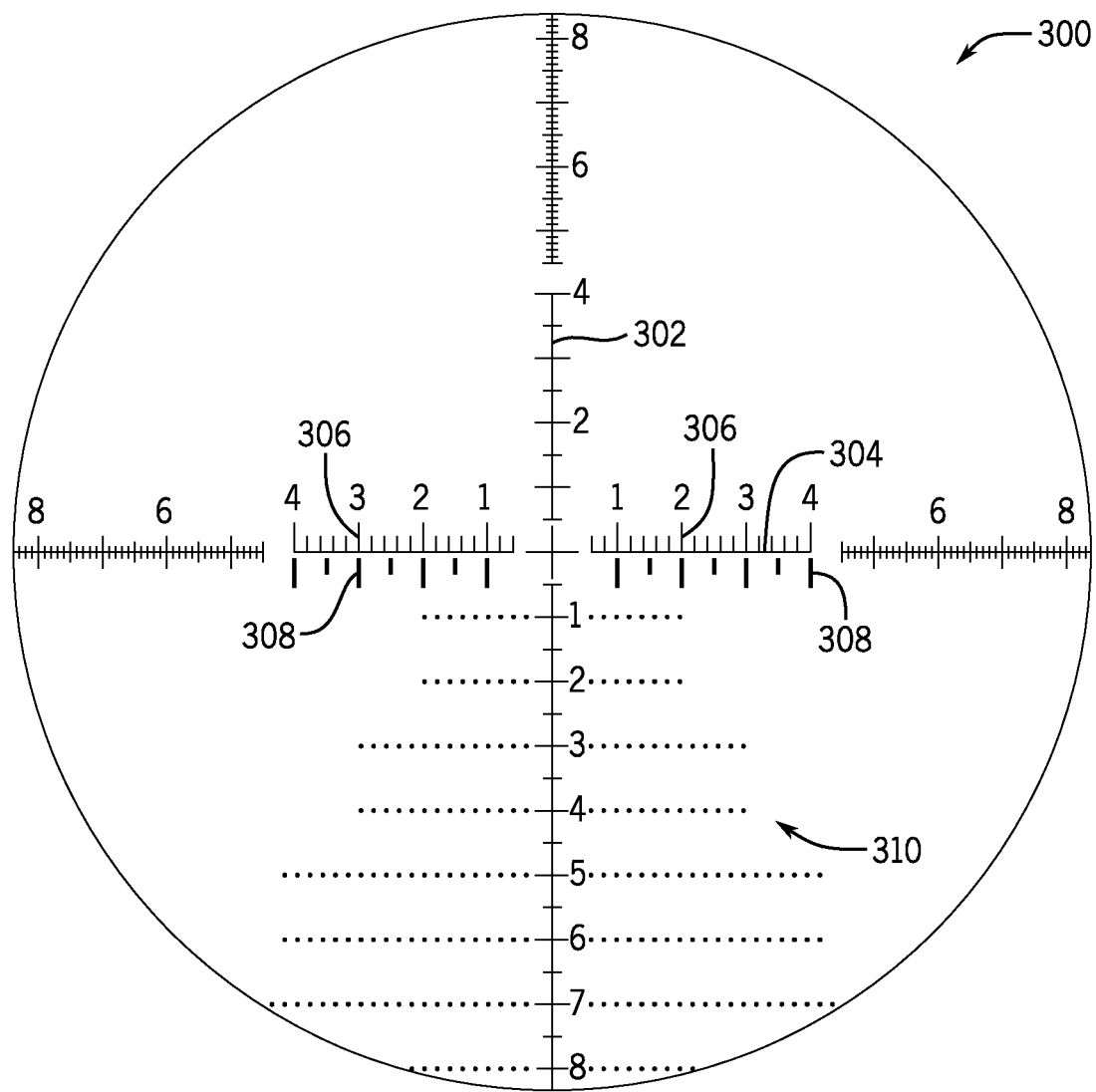
FIG. 7 is a view through the first focal plane reticle of FIG. 6 as viewed at a lower magnification setting.
Figure 8:
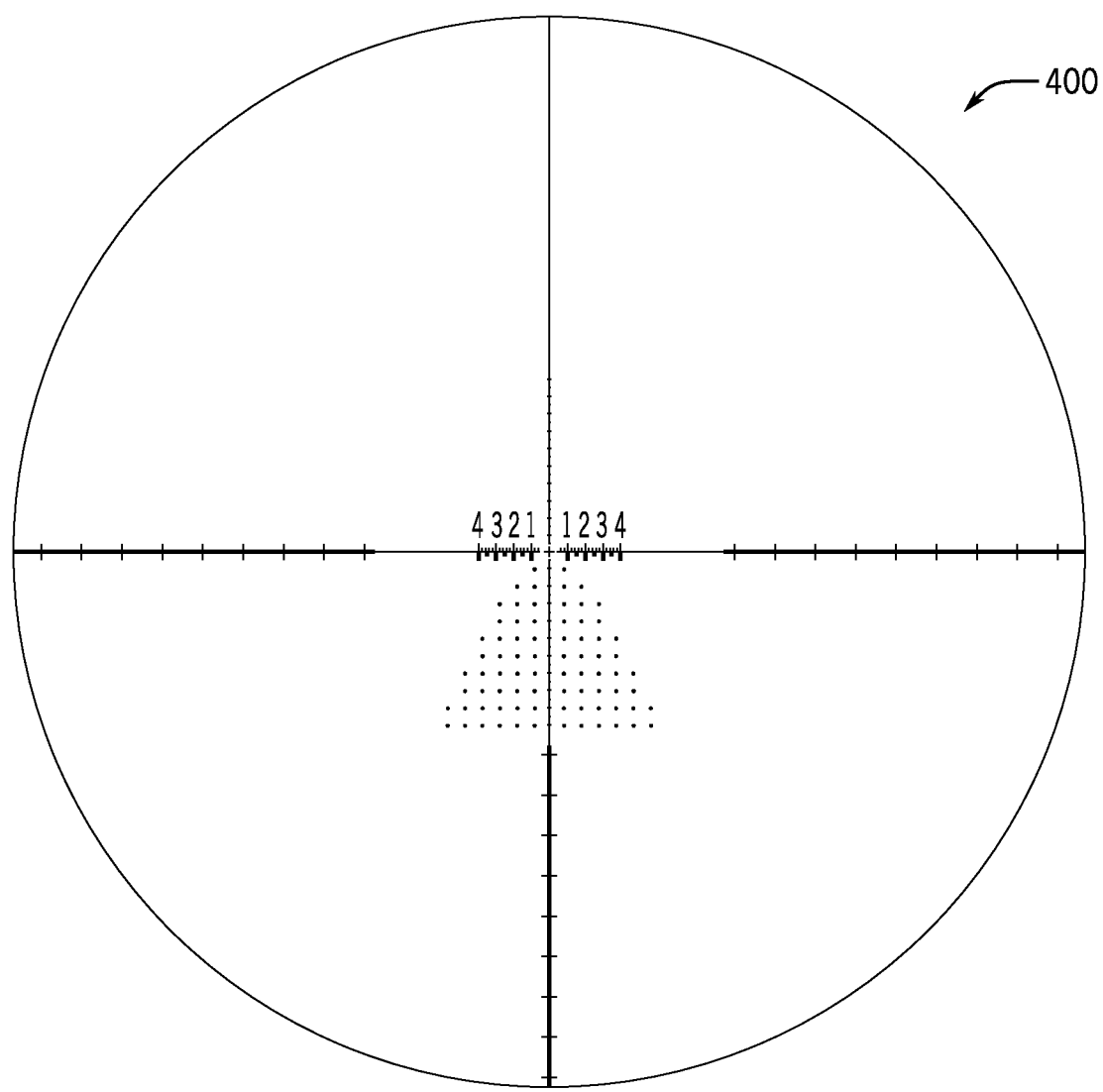
FIG. 8 is a view through one embodiment of a first focal plane reticle in accordance with the present invention as viewed at a higher magnification setting.
Figure 9:
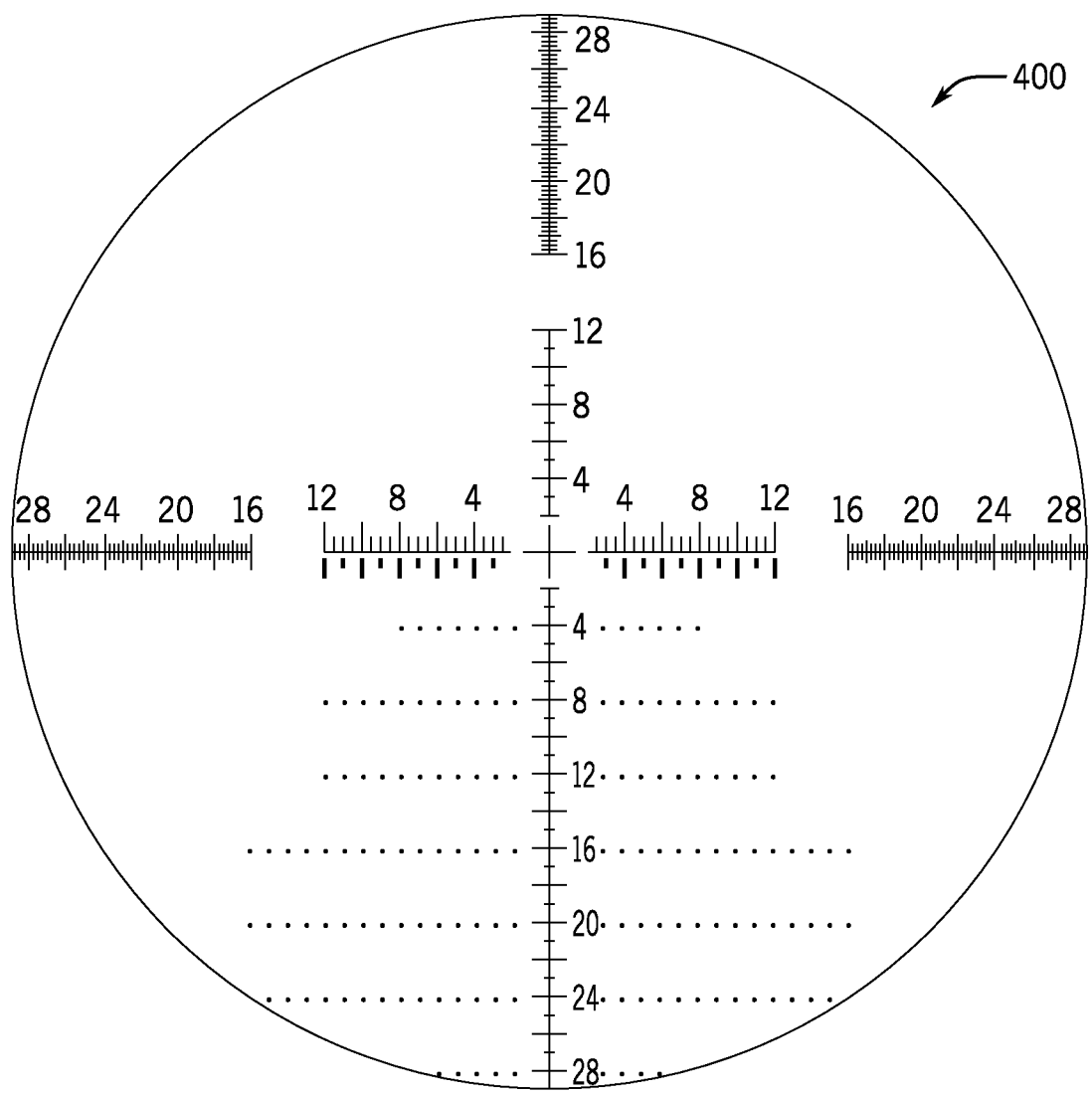
FIG. 9 is a view through the first focal plane reticle of FIG. 8 as viewed at a lower magnification setting.
Figure 15:
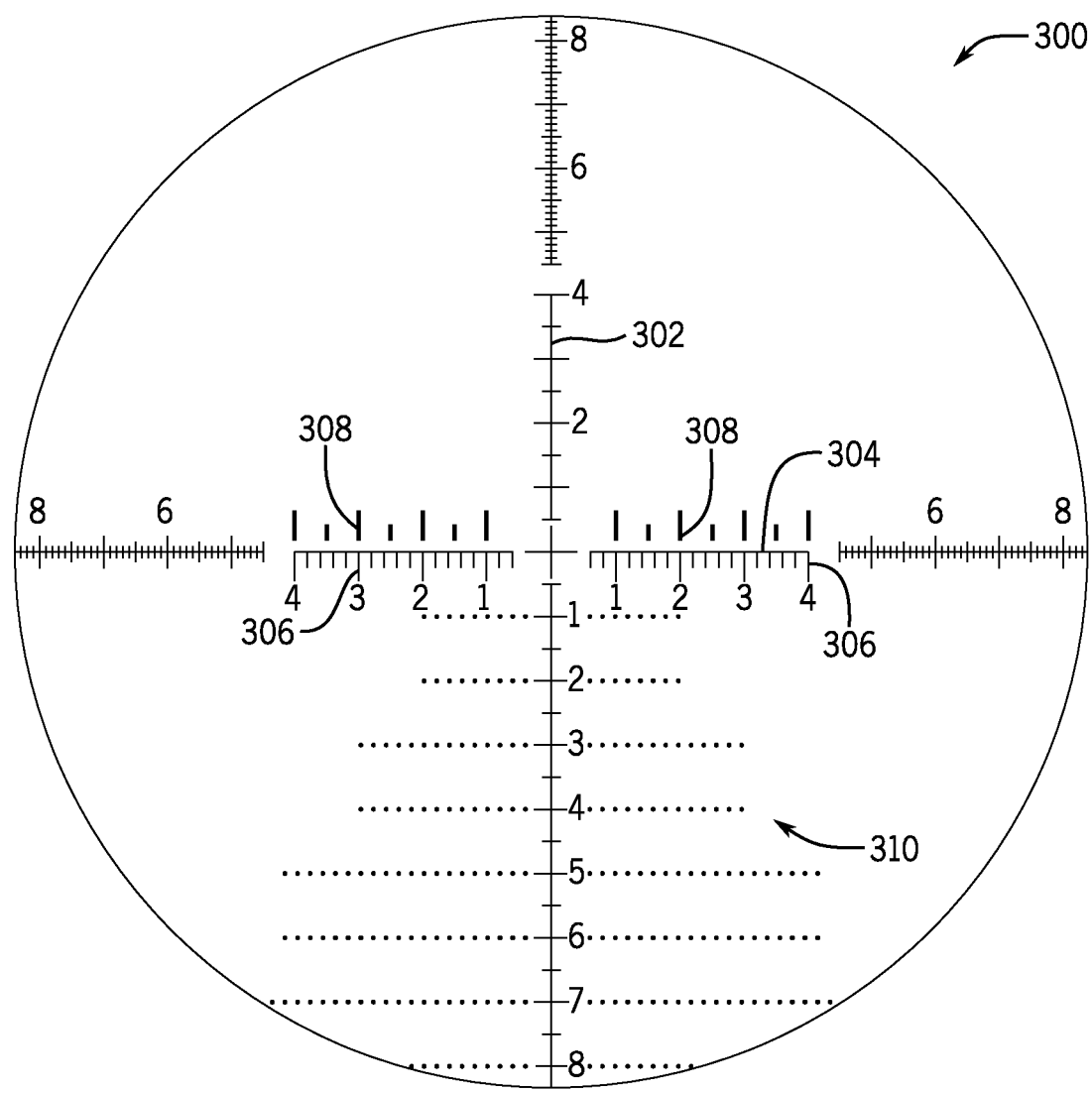
FIG. 15 is a view through one embodiment of a first focal plane reticle in accordance with the present invention as viewed at a higher magnification setting.

Turning now to FIGS. 6-7, one embodiment of a reticle 300 in accordance with the invention is shown. Reticle 300 includes units shown in MRAD and includes vertical stadia line 302 and horizontal stadia line 304. Although the scale used for reticle 300 is MRADs, a similar reticle 400 using MOA for its scale is shown in FIGS. 8-9. Reticle 300 also includes a Christmas tree dot pattern 310 on the lower half of the reticle. Reticle 300 provides information that includes subtension markings that aid shooters aiming at both stationary and moving targets, especially when the shooter wants to dial for elevation along vertical stadia line 302, but hold for wind along horizontal stadia line 304. In particular, fine subtension markings 306 may be used for aiming at stationary targets and is shown with a fine scale showing 0.2 MRAD increments. Fine subtension markings 306 are connected to the horizontal stadia line 304 to provide multiple fine aiming points along the horizontal axis. Coarse subtension markings 308 are located below horizontal stadia line 304 and are thicker than fine subtension markings 306. Coarse subtension markings 308 are thicker to allow the shooter's eye to pick them up more quickly when tracking a moving target, especially at a lower magnification setting. FIG. 7 shows the view through reticle 300 in such a lower magnification setting and coarse subtension markings 308 are more easily viewed than fine subtension markings 306. In addition, coarse subtension markings 308 are disconnected from the horizontal stadia line 304 and are shown with a coarse scale showing 0.5 MRAD subtension markings. The coarse subtension markings 308 are disconnected from the horizontal stadia line 304 to allow the fine intersected aiming points of the fine subtension markings 306 to be unobstructed for fine windage aiming points on the top of the horizontal stadia line 304. The intersected aiming points are not necessary for the relatively coarse aiming required for moving targets. Although the fine subtension markings 306 are shown above the horizontal stadia line 304 and the coarse subtension markings 308 are shown below the horizontal stadia line 304, the fine subtension markings may alternatively be located below the horizontal stadia line and the coarse subtension markings may alternatively be located above the horizontal stadia line. An example of such a configuration is shown in FIG. 15.

Another advantage of reticle 300 is that the combination of fine subtension markings 306 and coarse subtension markings 308 enhance the readability of both sets of subtension markings that use different scales. For example, in reticle 300, the fine subtension markings 306 are shown in 0.2 MRAD increments and the coarse subtension markings 308 in shown in 0.5 MRAD increments. It is sometimes difficult to quickly determine which marking the shooter is looking at. The inclusion of a different scale on the bottom actually helps with the determination process. In reticle 300, it is easy to determine the 0.4 and 0.6 fine subtension markings above the horizontal stadia line 304 because they are to the immediate right and left of the 0.5 coarse subtension markings 308. Of course, any other suitable scales may also be used with similar effect without departing from the invention.

Figure 10:
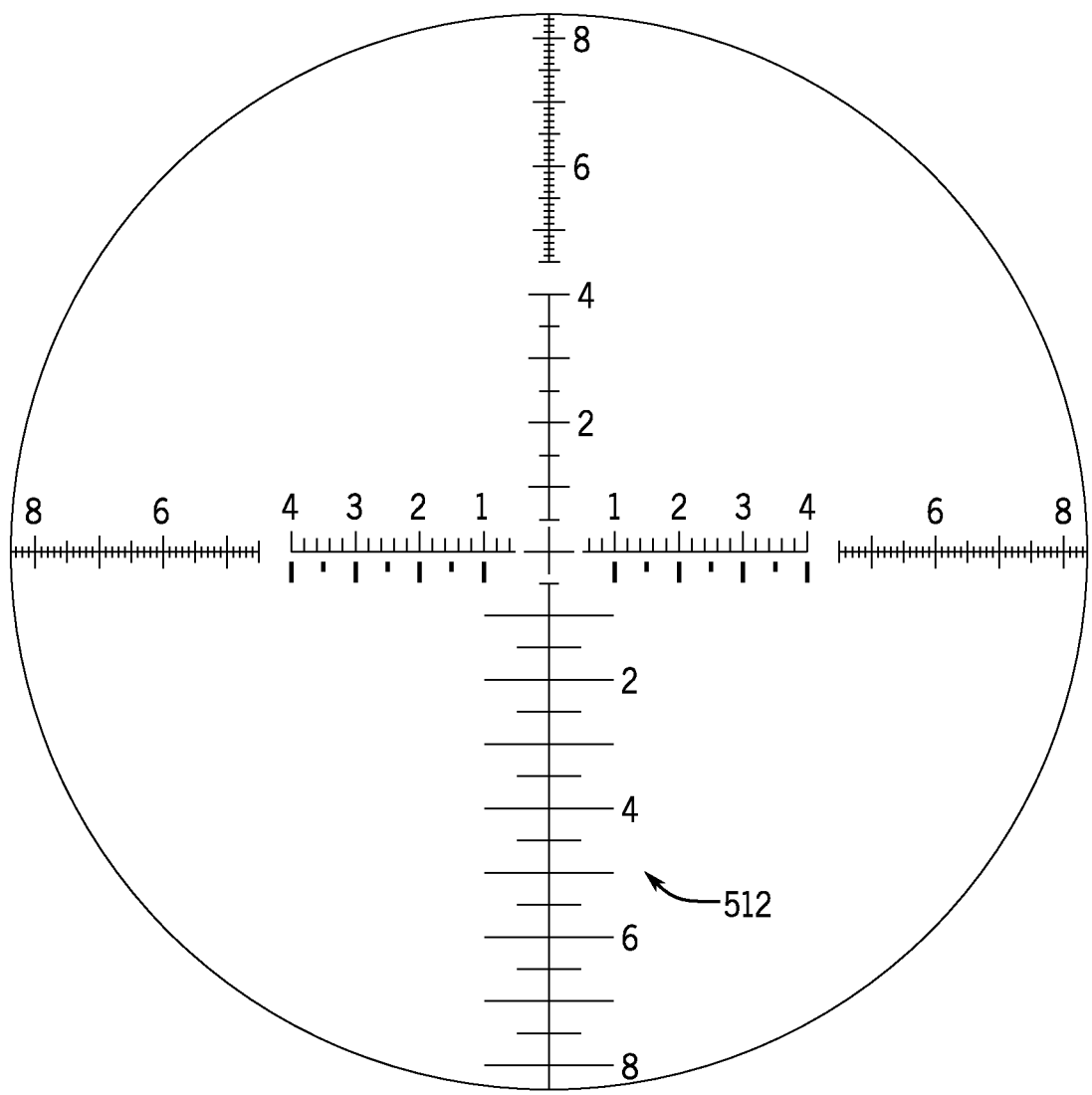
FIG. 10 is a view through one embodiment of a first focal plane reticle in accordance with the present invention as viewed at a higher magnification setting.

FIG. 10 shows another embodiment of a reticle 500 in accordance with the invention. Reticle 500 is shown in MRADs, and has similar markings to reticle 300, except the christmas tree dot pattern 310 is replaced by a simplified scale 512 shown in 0.5 MRAD increments. Simplified scale 512 also only includes even numbered numerals to reduce clutter on the lower half of reticle 500.

Figure 11:
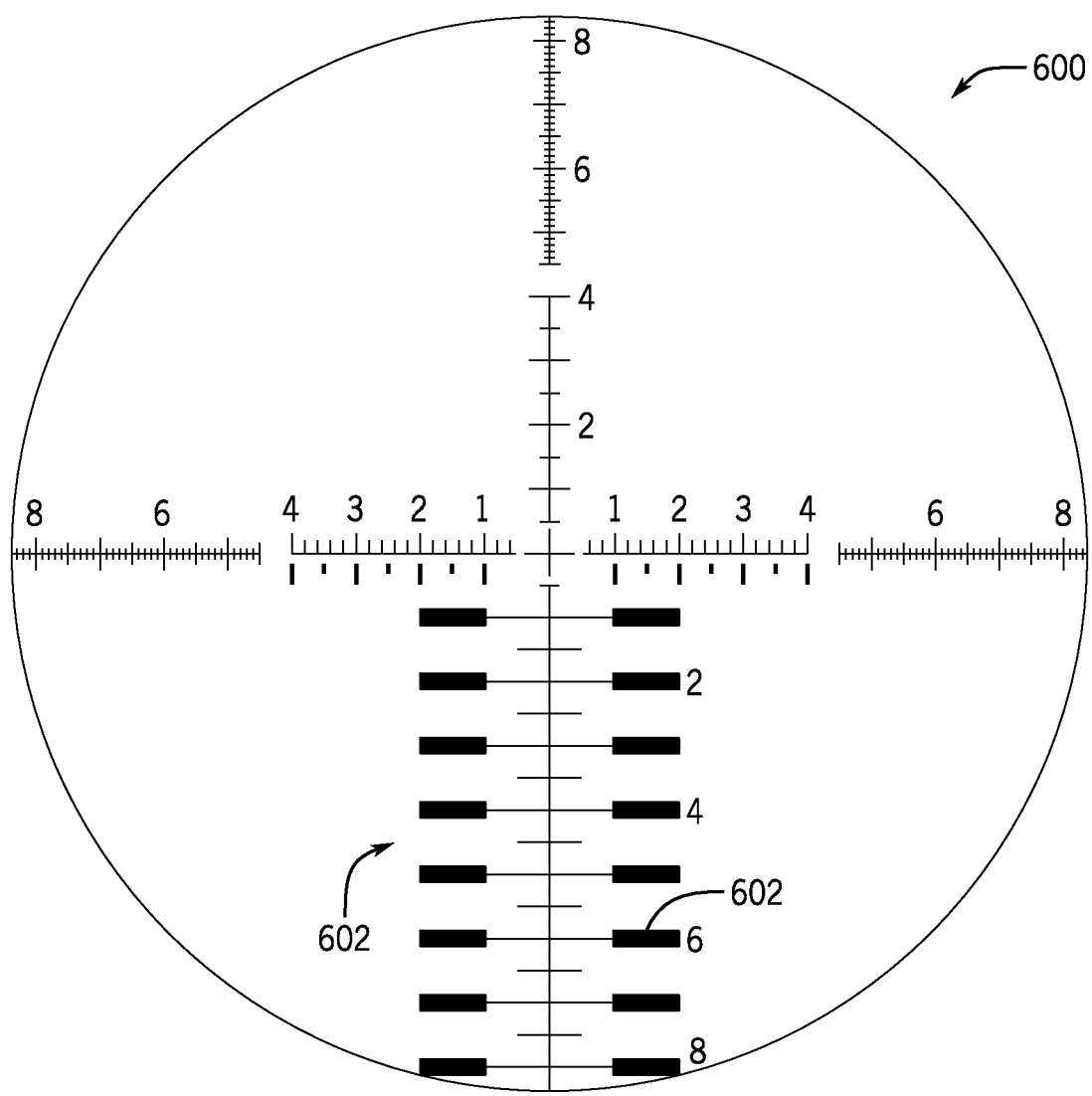
FIG. 11 is a view through one embodiment of a first focal plane reticle in accordance with the present invention as viewed at a higher magnification setting.

FIG. 11 shows another embodiment of a reticle 600 in accordance with the invention. Reticle 600 takes the lower half scale of reticle 500 and adds thick sections 602 to certain parts of the lower scale 612. The thick sections 602 are shown at 1 MRAD increments, making them easy to find quickly.

Figure 12:
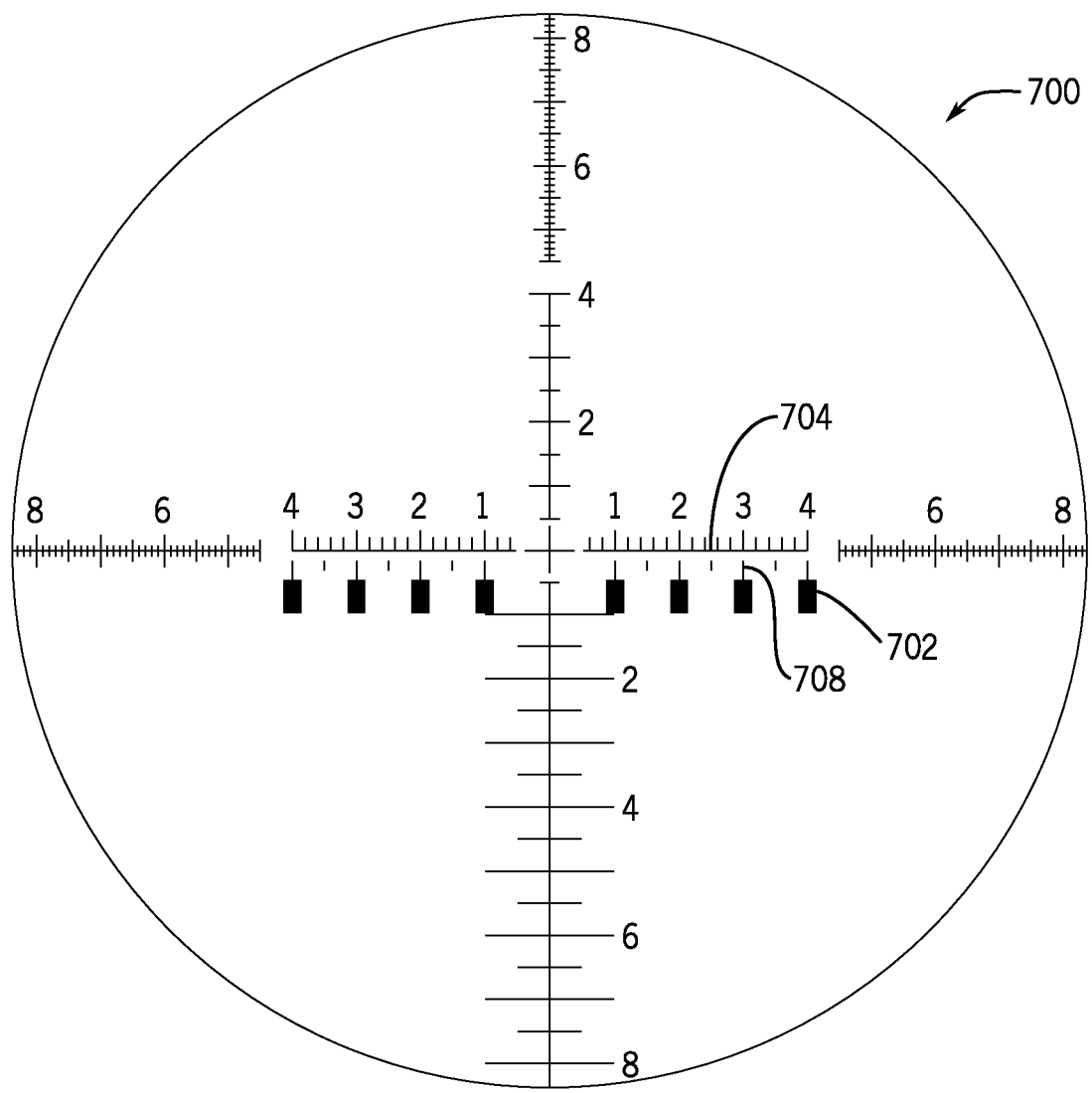
FIG. 12 is a view through one embodiment of a first focal plane reticle in accordance with the present invention as viewed at a higher magnification setting.
Figure 14:
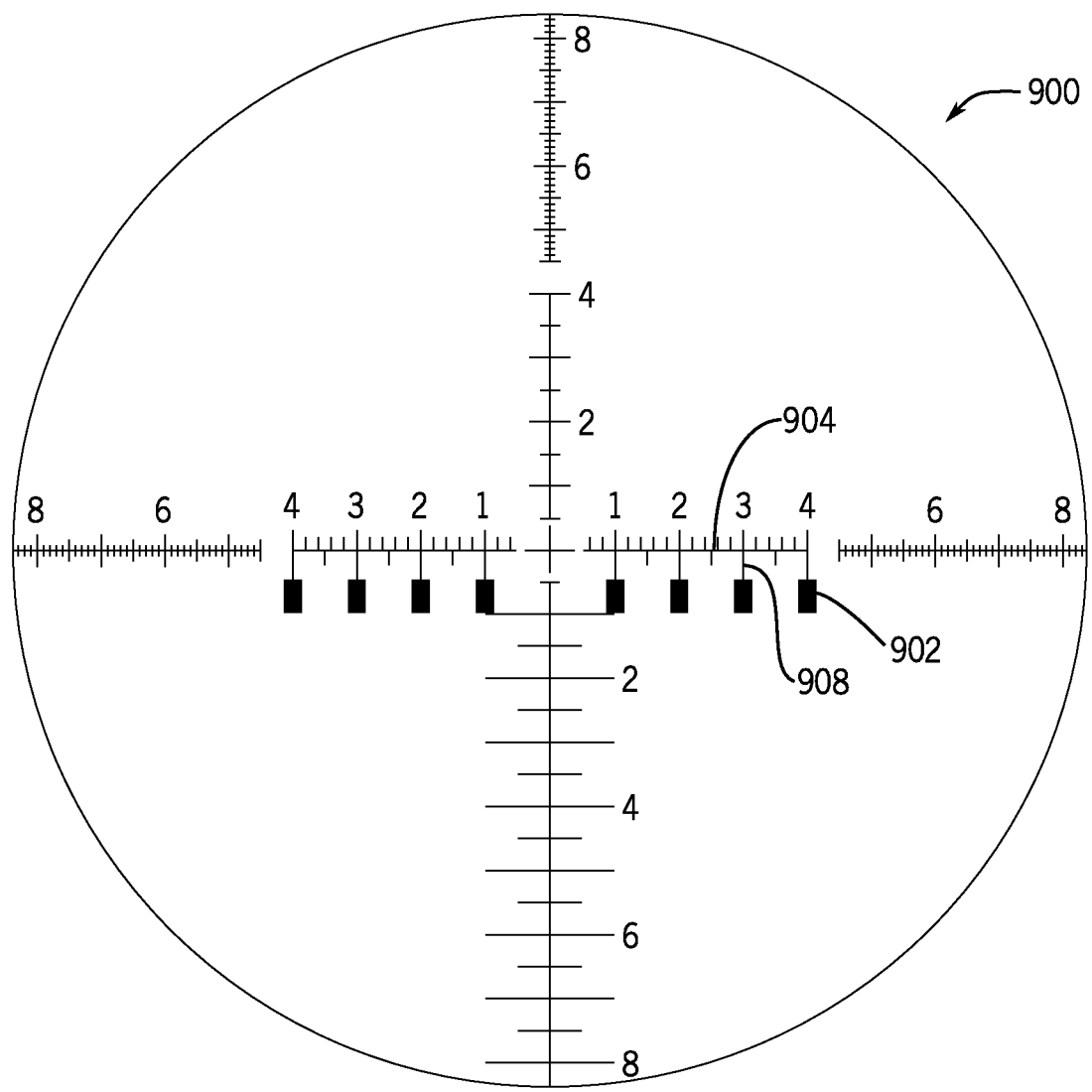
FIG. 14 is a view through one embodiment of a first focal plane reticle in accordance with the present invention as viewed at a higher magnification setting.

FIG. 12 shows yet another embodiment of a reticle 700 in accordance with the invention. Reticle 700 includes even thicker sections 702 to coarse subtension markings 708. Coarse subtension markings 708 are disconnected from horizontal stadia line 704. The thicker sections 702 are shown at 1 MRAD increments and have increased visibility. In an alternative embodiment shown in FIG. 14, reticle 900 includes thick sections 902 to coarse subtension markings 908, but the subtension markings intersect horizontal stadia line 904.

Figure 13:
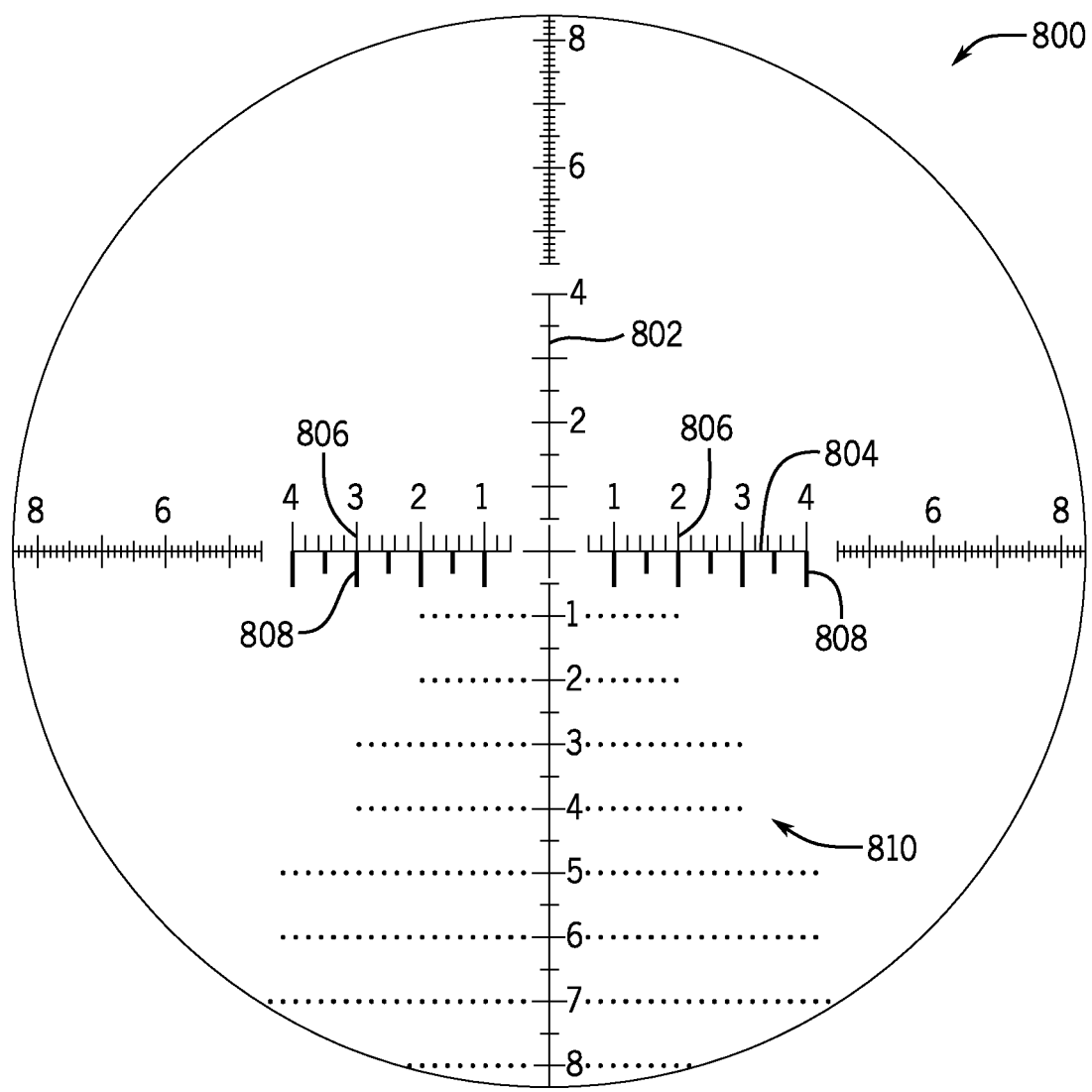
FIG. 13 is a view through one embodiment of a first focal plane reticle in accordance with the present invention as viewed at a higher magnification setting.

FIG. 13 shows another embodiment of a reticle 800 in accordance with the invention. Reticle 800 is similar to reticle 300 in that it includes vertical stadia line 802 and horizontal stadia line 804, a Christmas tree dot pattern 810 on the lower half of the reticle. Fine subtension markings 806 are connected to the horizontal stadia line 304 to provide multiple fine aiming points along the horizontal axis. Coarse subtension markings 808 are located below horizontal stadia line 804 and are thicker than fine subtension markings 806. As with reticle 300, coarse subtension markings 808 are thicker to allow the shooter's eye to pick them up more quickly when tracking a moving target, especially at a lower magnification setting. Unlike reticle 300, in which coarse subtension markings 308 are disconnected from the horizontal stadia line 304, coarse subtension marking 808 are connected to the horizontal stadia line 804.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. An optical sighting device comprising:
   a body with a first end and a second end and having a center axis; an
   objective lens system disposed within the body;
   an eyepiece lens disposed within the body;
   an erector lens system disposed within the body; the objective lens system, eyepiece lens, and erector lens system forming an optical system having a first focal plane and a second focal plane, the first focal plane proximate the objective lens system and the second focal plane proximate the eyepiece lens;
   a first reticle at the first focal plane;
   the first reticle including a horizontal stadia line and a vertical stadia line;
   the first reticle further including a plurality of elevation subtension markings having a thickness and are connected to the vertical stadia line;
   the first reticle further including a plurality of numerical markings positioned along the horizontal stadia line;
   the first reticle further including a plurality of fine subtension markings positioned along the horizontal stadia line and having a thickness; and
   the first reticle further including a plurality of coarse subtension markings, wherein the entirety of each coarse subtension marking is located below the horizontal stadia line and above a first secondary horizontal line and having a thickness greater than the thickness of the fine subtension markings, and further wherein the coarse subtension markings and the numerical markings are separate markings.

2. The optical sighting device of claim 1, wherein the elevation, fine, and coarse subtension markings measure MRADs.

3. The optical sighting device of claim 1, wherein the elevation, fine, and coarse subtension markings measure MOA.

4. The optical sighting device of claim 1, wherein the fine subtension markings are located above the horizontal stadia line.

5. The optical sighting device of claim 1, wherein the fine subtension markings are connected to the horizontal stadia line.

6. The optical sighting device of claim 1, wherein the coarse subtension markings are disconnected from the horizontal stadia line.

7. The optical sighting device of claim 1, wherein the coarse subtension markings are connected to the horizontal stadia line.

8. The optical sighting device of claim 1, wherein the reticle includes a Christmas tree dot pattern below the horizontal stadia line.

9. The optical sighting device of claim 1, wherein at least one of the elevation subtension markings have a thickness greater than the other elevation subtension markings.

10. The optical sighting device of claim 1, wherein the plurality of numerical markings are located above the horizontal stadia line.

11. A reticle for an optical sighting device comprising;
   a horizontal stadia line and a vertical stadia line;
   a plurality of elevation subtension markings having a thickness and are connected to the vertical stadia line;
   a plurality of fine subtension markings positioned along the horizontal stadia line and having a thickness;

a plurality of numerical markings positioned along the horizontal stadia line; and a plurality of coarse subtension markings, wherein the entirety of each coarse subtension marking is located below the horizontal stadia line and above a secondary horizontal line and having a thickness greater than the thickness of the fine subtension markings, wherein the coarse subtension markings and the numerical markings are separate markings.

12. The reticle of claim 11, wherein the elevation, fine, and coarse subtension markings measure MRADs.

13. The reticle of claim 11, wherein the elevation, fine, and coarse subtension markings measure MOA.

14. The reticle of claim 11, wherein the fine subtension markings are located above the horizontal stadia line.

15. The reticle of claim 11, wherein the reticle includes a Christmas tree dot pattern below the horizontal stadia line.

16. The reticle of claim 11, wherein at least one of the elevation subtension markings have a thickness greater than the other elevation subtension markings.

17. The reticle of claim 11, wherein the fine subtension markings are connected to the horizontal stadia line.

18. The reticle of claim 11, wherein the coarse subtension markings are disconnected from the horizontal stadia line.

19. The reticle of claim 11, wherein the coarse subtension markings are connected to the horizontal stadia line.

20. The reticle of claim 11, wherein the plurality of numerical markings are located above the horizontal stadia line.

* * * * *